Patented Oct. 4, 1949

2,483,959

UNITED STATES PATENT OFFICE 2,483,959

VINYL CHLORIDE POLYMER COMPOSITIONS CONTAINING MALEIC - VINYL ACETATE HETEROPOLYMERS AND COMPOUNDS OF LEAD, CALCIUM, OR BARIUM

Massimo Baer, Springfield, Mass., assignor to Monsanto Chemical Company, St. Louis, Mo., a corporation of Delaware No Drawing. Application February 26, 1948, Serial No. 11,339

16 Claims. (Cl. 260—45.75)

1

This invention relates to improved vinyl chloride-containing polymeric products. More particularly, this invention relates to vinyl chloride-containing polymers having improved stability and electrical properties.

It is well known to prepare polymeric products from vinyl chloride and these materials are finding greatly expanding usefulness. Among the problems which have been presented in preparing high quality products are improvement in light and heat stability and electrical properties. Frequently, the polymeric products are prepared by polymerization while dispersed in an aqueous medium. Such products present the problem of counteracting the deleterious effects of dispersing agents which remain in the polymer.

In my copending application, Serial No. 691,412, filed August 17, 1946, now Patent Number 2,476,474, an improved process for polymerizing vinyl chloride in aqueous suspension is described and claimed. This process comprises carrying out the polymerization in the presence of a heteropolymer of maleic acid or anhydride and vinyl acetate. The products results from this process are found to be of unexpected value, for example, these products are readily stabilized against the action of light and heat and compositions made therefrom are especially valuable for electrical insulating purposes. However, it is found that further unexpected improvements may be effected in such polymeric products by means of the present invention.

It is an object of this invention to provide improved vinyl chloride-containing polymers. A further object is to provide vinyl chloride-containing polymers having improved light and heat stability. Another object is to provide vinyl chloride polymers having improved electrical properties.

These and other objects are attained according to this invention by associating with vinyl chloride polymers and copolymers a combination of a heteropolymer of vinyl acetate and maleic acid or anhydride, and a salt, hydroxide or oxide of lead, barium or calcium.

According to a particular embodiment of the invention, vinyl chloride polymers and copolymers which contain an heteropolymer of vinyl acetate and maleic acid or anhydride are treated with a salt, hydroxide or oxide of a metal from the group consisting of lead, calcium and barium. As a result of this treatment, the resulting polymers are found to have greatly enhanced light and heat stability, coupled with improved electrical characteristics.

2

The following examples are illustrative of the present invention, but are not to be considered as limitative of the scope thereof.

Example I

Polyvinyl chloride made by polymerizing vinyl chloride in the presence of 0.15 part of a heteropolymer of equimolecular proportions of vinyl acetate and maleic anhydride and 200 parts of water for every 100 parts of polyvinyl chloride and thereafter thoroughly washed with water, is mixed with an equal weight of a 1% aqueous solution of lead acetate. The resulting slurry is heated with stirring for about 30 minutes at 60–80° C. Thereafter, the polymer is freed from the aqueous medium by centrifuging and slurried with water until free from extractable salts and then dried. The resulting product is found to have unexpectedly improved heat and light stability as compared with the untreated polymer. In addition, the electrical properties also show great improvement.

Example II

Example I is repeated, except that the polymeric product is a copolymer of vinyl chloride and diethyl maleate, 88% by weight of the copolymer comprising vinyl chloride groups and the metal compound is calcium acetate. The product possesses improved stability and electrical properties as compared with the untreated polymer.

Example III

Example I is repeated except that the polymer is made by polymerizing an aqueous suspension of 96 parts by weight of vinyl chloride in the presence of 6 parts by weight of diethyl phthalate and 0.12 parts by weight of the heteropolymer suspending agent. Similar improvement in the properties of the polymer are obtained by treatment with barium hydroxide under the conditions set forth in Example I.

As pointed out above, my co-pending application Ser. No. 691,412 describes and claims the polymerization of vinyl chloride-containing materials in the presence of water-soluble heteropolymers of maleic acid or anhydride and vinyl acetate while dispersed in an aqueous medium. The resulting polymer is separated from the aqueous medium, for example, by centrifuging, and washed to remove water-soluble materials. However, it is found that all of the heteropolymer is not removed by washing and the amounts that remain are deleterious to the polymeric product. By treatment of such polymers in accordance with the invention, these deleterious effects are largely overcome.

The amounts and concentrations of solutions of barium, calcium or lead compounds used to treat the polymeric products may be substantially varied. Usually it is found that 50-200 or more parts of solution are advantageously used for every 100 parts of polymer. While effective results may be obtained with smaller amounts, agitation is rendered difficult and effective reaction may be unduly slowed down. The maximum amount of treating solution is not critical and is determined to a large degree by economic considerations.

The concentration of the treating solution is determined by such factors as the solubility of the metal compound which is used, the amount of solution used and the amount of heteropolymer in the polymeric product to be treated. These several factors should be so correlated that at least sufficient salt is present so that the amount of combined metal is at least stoichiometrically equivalent to the free acid groups in the heteropolymer and, preferably, an excess is used, e. g., 100-500% or more.

Usually it is found that slurrying the polymer with the aqueous solution of the treating salt at a somewhat elevated temperature serves to accelerate the reaction without imparting deleterious effects. Thus, temperatures of 40-90° C. may be advantageously employed.

In its broad aspects, the invention is not limited to treatment of polymeric products prepared in aqueous suspension, but may be used in the case of polymers prepared by the so-called solution, emulsion, or mass polymerization processes and containing heteropolymers of vinyl acetate and maleic acid or anhydride, incorporated before, during or after polymerization.

The amounts of heteropolymer present in the polymeric products to be treated in accordance with the invention may vary substantially. When the heteropolymer is used as the suspending agent in the suspension polymerization of vinyl chloride and/or copolymer thereof, usually not more than 1% is associated with the polymer after removal of the dispersion medium. The amount which is present may be further reduced by washing the polymer although the necessity of washing operations is reduced when the polymer is to be treated in accordance with the invention.

On the other hand, it may be desirable to include larger amounts of the heteropolymer to achieve characteristics in the final product resulting therefrom. Thus, polymers made by the mass, suspension, emulsion, solution, or other methods of polymerization may have included therein heteropolymer in amounts ranging up to 25% based on the vinyl chloride polymer or copolymer. For most purposes, however, not over 5% of heteropolymer is present.

The heteropolymer present in the polymeric product may result not only from inclusion with the monomeric materials during polymerization, but solely or in part from incorporation in the polymer following polymerization. Regardless of the stage of the preparation of the polymer at which the heteropolymer is incorporated, the advantages of treating the polymer in accordance with the invention apply.

Instead of incorporating the lead, barium or calcium compound by slurrying an aqueous solution or suspension of the salt with the vinyl chloride-containing polymer, the salt may be mixed with the polymer by other means, e. g., on milling rolls, in a Banbury mixer, etc. At some stage, the mix may be advantageously subjected to the action of heat. When the components are slurried together, this may be done during the slurrying operation. When the components are mixed in the dry state, the mixture may be heated during or subsequent to the mixing operation. Usually temperatures of 40-150° C. are used, shorter periods of time being used as the temperature is raised. Heating for at least 15-30 minutes at 60-80° C. is desirable; at 150° C. 5 minutes is usually sufficient to achieve effective results. Longer periods of heating may be used, but at the higher temperatures, unduly long heating periods should be avoided.

In place of the salts used in the examples, other salts or oxides, or hydroxides of lead, calcium and barium or mixtures thereof may be used. Examples of other compounds which may be used include lead hydroxide, lead chloride, lead formate, lead nitrate, lead sulfate, lead bromide, basic lead carbonate, lead borate, lead carbonate, lead oxalate, lead oxides, calcium formate, calcium bromide, calcium borate, calcium oxide, calcium hydroxide, calcium sulfate, calcium lactate, calcium nitrate, calcium carbonate, calcium chloride, calcium citrate, barium citrate, barium oxide, barium silicate, barium formate, barium propionate, barium sulfate, barium chloride, barium bromide, barium butyrate, barium hydroxide, barium acetate, barium carbonate, barium citrate, barium malate, barium malonate, barium oxide, barium phosphates, barium silicate, barium succinate, barium sulfate.

Of the various compounds of lead, barium and calcium which may be used in accordance with the invention, the hydroxides and salts of weak acids, i. e., the carbonates and salts of organic acids are preferred. Also, when the treatment is carried out in an aqueous slurry, compounds having a solubility in water at ordinary temperatures of at least 0.01% and more particularly, at least 1%, are preferred.

As pointed out above, the invention comprises not only vinyl chloride polymeric products which are made in the presence of heteropolymers of vinyl acetate and maleic anhydride, but also vinyl chloride polymeric products in which the heteropolymers are incorporated subsequent to polymerization. Thus, treatment according to the invention does more than overcome certain disadvantages imparted by the presence of the heteropolymer, as indicated below.

Four batches of polyvinyl chloride, made by the aqueous suspension process in the presence of maleic anhydride-vinyl acetate heteropolymer, plasticized with 50 parts of di(2-ethylhexyl) phthalate for every 100 parts of polyvinyl chloride, are prepared. One batch is used as a blank and to the remaining batches basic lead carbonate and/or additional vinyl acetate-maleic anhydride heteropolymer are incorporated on milling rolls in the proportions indicated below for every 100 parts of polyvinyl chloride.

| Batch No. | Basic Lead Carbonate | Heteropolymer | Relative Volume Resistivities (electrical) |
|---|---|---|---|
| A | | | 30 |
| B | 3.0 | | 95 |
| C | | 0.2 | 16 |
| D | 3.0 | 0.2 | 150 |

On comparing the volume resistivities of batches

A, B, C and D, it is to be seen that the resistivity of batch D is more than 50% greater than batch B. Thus, the combination of basic lead carbonate and vinyl acetate-maleic anhydride copolymer adds to the electrical properties of the invention.

According to another embodiment of the invention, the heteropolymer is admixed with the metal compound and the resulting combination incorporated in the polymer. The admixture may be made with dry ingredients or an aqueous slurry or solution of the two ingredients may be prepared and heated. In the latter case, a solid reaction product separates from the aqueous medium and may be recovered by centrifuging followed by drying. This product may then be incorporated in the polymer.

The process of the invention is applicable, not only to polyvinyl chloride, but also to copolymers of vinyl chloride and copolymerizable unsaturated compounds generally. As examples of copolymers of vinyl chloride which may be treated in accordance with the present invention, are copolymers of vinyl chloride and vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of $\alpha,\beta$-unsaturated aliphatic carboxylic acids, for example, the methyl, ethyl, propyl, butyl, amyl, hexyl, heptyl, octyl, allyl, methallyl and phenyl esters of maleic, crotonic, itaconic, fumaric acids and the like. The invention is particularly applicable to copolymers in which a predominate portion, i. e., more than 50% by weight of the copolymer is made up of vinyl chloride.

A particularly preferred embodiment of the invention comprises the treatment of copolymers of vinyl chloride and an ester of an $\alpha,\beta$-unsaturated dicarboxylic acid such as diethyl maleate, in which 5-20 parts by weight of diethyl maleate are used for every 95-80 parts by weight of vinyl chloride. Among the preferred esters of $\alpha,\beta$-unsaturated dicarboxylic acids are the alkyl esters in which the alkyl group contains 2-8 carbon atoms.

It is obvious that many variations may be made in the processes and products of this invention without departing from the spirit and scope thereof as defined in the appended claims.

What is claimed is:

1. A process for improving the stability of polymers from the group consisting of polyvinyl chloride and copolymers of vinyl chloride and water-insoluble ethylenically unsaturated compounds copolymerizable therewith, said polymers having been formed by polymerization in aqueous suspension in the presence of a maleic-vinyl acetate copolymer which comprises heating an aqueous slurry of said polymer and a compound from the group consisting of salts, hydroxides and oxides of lead, barium and calcium, the amount of metal in said compound being at least stoichiometrically equivalent to the amount of heteropolymer present.

2. A process as defined in claim 1 in which the polymer is polyvinyl chloride.

3. A process as defined in claim 2 in which the metal compound is a lead compound.

4. A process as defined in claim 2 in which the metal compound is a calcium compound.

5. A process as defined in claim 2 in which the metal compound is a barium compound.

6. A process as defined in claim 1 in which the polymer is a copolymer of vinyl chloride and diethyl maleate and the metal compound is a lead compound.

7. A process as defined in claim 1 in which the polymer is a copolymer of vinyl chloride and diethyl maleate and the metal compound is a calcium compound.

8. A process as defined in claim 1 in which the polymer is a copolymer of vinyl chloride and diethyl maleate and the metal compound is a barium compound.

9. A process as defined in claim 1 in which the polymer is a copolymer of vinyl chloride and a vinyl ester of a fatty acid having 2–4 carbon atoms.

10. A process as defined in claim 1 in which the polymer is a copolymer of vinyl chloride and vinyl acetate and the metal compound is a lead compound.

11. A process as defined in claim 1 in which the polymer is a copolymer of vinyl chloride and vinyl acetate and the metal compound is a calcium compound.

12. A process as defined in claim 1 in which the polymer is a copolymer of vinyl chloride and vinyl acetate and the metal compound is a barium compound.

13. A composition comprising a polymer from the group consisting of polyvinyl chloride and copolymers of vinyl chloride and unsaturated compounds copolymerizable therewith and containing ethylenic unsaturation, a maleic-vinyl acetate heteropolymer and a compound from the group consisting of salts, hydroxides and oxides of lead, calcium and barium.

14. A product as defined in claim 13 in which the polymer is polyvinyl chloride.

15. A product as defined in claim 13 in which the polymer is a copolymer of vinyl chloride and diethyl maleate.

16. A product as defined in claim 13 in which the polymer is a copolymer of vinyl chloride and vinyl acetate.

MASSIMO BAER.

No references cited.